UNITED STATES PATENT OFFICE.

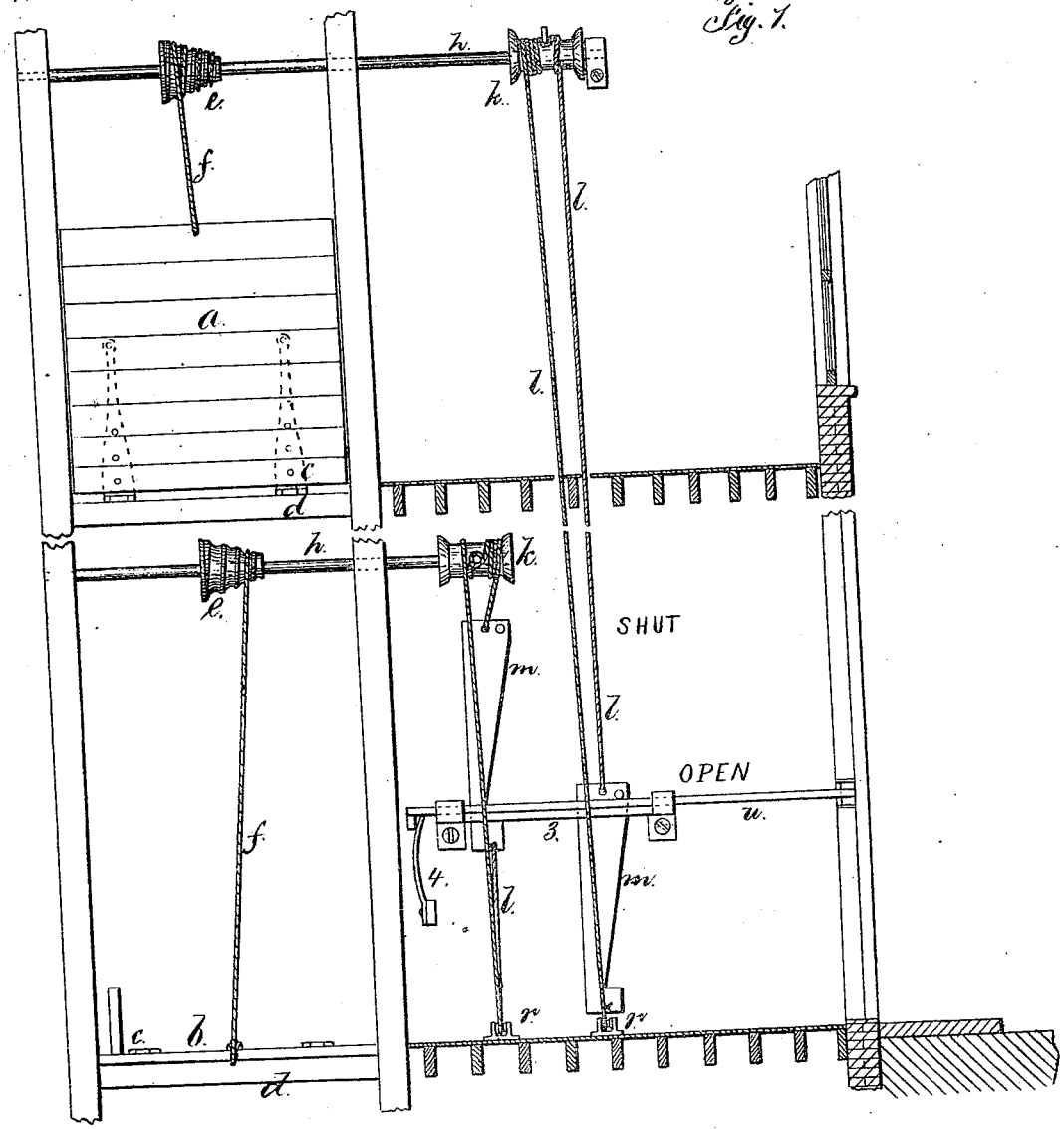

DANIEL MOORE, OF BROOKLYN, NEW YORK, ASSIGNOR TO JOSEPH GOLD-MARK, OF SAME PLACE.

IMPROVEMENT IN HATCH CLOSING AND INDICATING APPARATUS.

Specification forming part of Letters Patent No. 161,429, dated March 30, 1875; application filed February 13, 1875.

*To all whom it may concern:*

Be it known that I, DANIEL MOORE, of Brooklyn, in the county of Kings and State of New York, have invented an Improvement in Hatch Closing and Indicating Apparatus, of which the following is a specification:

The objects of this invention are, first, to balance the hatch in all its positions so that it will require but little power in opening or closing the same, and so that it will not require more power to move it in one position than in another; second, to indicate at one convenient position, near the front door of the building, whether the hatches are open or shut, and to allow them to be opened or shut at this point as well as at the hatch itself; third, to provide an additional security against carelessness in closing the hatches, by preventing the door of the building being locked until the hatches are closed.

By this improvement great safety against the spread of fire is insured, and the watchman, or the person closing the building, does not have to go from place to place examining the hatches, but he simply has to observe the indicating apparatus, and he can immediately close any hatch that may be open.

In the drawing, Figure 1 is an elevation representing the improvement as applied with two hatches, and Fig. 2 is a sectional plan of the safety-bar and balance-weights.

The hatches $a$ and $b$ are of any desired character. They are represented as hinged at $c$ and resting in combings $d$. There are but two hatches shown, but it will be understood that my improvements are available with any number of hatches in one building, because the devices employed are to be provided for each hatch, and the ropes, chains, or rods leading to such hatches are passed along the walls or floors, and pulleys or levers are employed where the direction of motion is changed. Each hatch is provided with a conical grooved barrel, $e$, to which one end of a rope or chain, $f$, is attached, and the other end of such rope or chain is fastened to the hatch. The pulley $e$ is upon the shaft $h$, and a drum, $k$, thereon is provided, around which ropes or chains $l$ pass in each direction to the weight $m$. One portion of such rope or chain goes down through the pulley $r$ and passes up to the weight $m$. The parts are so proportioned to each other and to the weight of the hatch that said hatch will be balanced or nearly so in any position. When the hatch is closed the weight $m$ has a leverage against the hatch, because the rope $f$ extends from the small part of the conical drum to the hatch; but when the hatch is almost raised and requires but little force to move it, then the rope is upon the portion of the drum that is large, and the weight has not any leverage to move said hatch. By this construction it will be apparent that the hatch can be so nearly balanced that it will take a very little power to move it, and the moving force can be applied directly to the hatch, or to the counter-weight; the hatch, however, must not be allowed to swing beyond the hinges or centers of support, or there would be nothing to move it to commence the closing operation; a stop or spring can be used to determine the position to which the hatch may be opened. The counter-weights are preferably located near each other, and they should be at the office or near the front part of the building, where the position of such weights will indicate whether the hatch with which they are connected is open or shut, and the weights should be provided with handles to move them and thus actuate the distant hatches. I make use of the weights $m$ as a means for actuating a safety-bolt, $u$, which by its end prevents the the bolt $v$ of the front door $w$ being thrown except when the hatches are all closed and the safety-bolt withdrawn. To accomplish this I make the counter-weights of a wedge shape, and pass them through slots in the stationary bar 3, and also through slots in the safety-bar $u$. When the hatches are all closed the narrower ends of the weights $m$ are in the slots in the bars, and hence the spring 4 is free to draw the end of the safety-bar out of the lock-nosing, so that the bolt of the door-lock can be projected; but when either weight is depressed, and the hatch open or partially so, the wedge shape of the weight causes the bar $u$ to be projected into the nosing and the door cannot be locked, hence the attention of the person closing up the building is called to the hatches because he cannot lock the outer door. This safety-bolt $u$ might be applied so as to prevent the outer door being closed, if desired.

I am aware that a swinging bridge has been balanced by a weight acting in connection with a scroll or cam-shaped groove and a circular wheel. In this case an adjustment cannot easily be effected. By the use of a conical graduated pulley the relative force exerted by a definite weight can be varied to suit the varying weights of hatches, because the length of rope may be such that more or less will remain upon the smaller part of the cone when the hatch is closed, and hence the counterbalancing weight will be more or less effective according to the diameter of the portion of the pulley upon which the rope is wound.

I claim as as my invention—

1. The conical grooved pulley $e$, connected by a rope or chain to the hatch, in combination with the counterbalance-weight $m$, suspended by a rope or chain, $l$, to the cylindrical drum $k$, for the purposes and as set forth.

2. The counterbalance-weights $m$, connected to the respective hatches by ropes or chains and intermediate pulleys or drums, and located side by side in a convenient position to form indicators, by which the condition of the various hatches in the building can be ascertained by inspection of such weights, substantially as set forth.

3. The safety bar or bolt $u$, combined with and actuated by the hatch opening and closing mechanism, whereby the bolt is interposed to prevent the door-lock being operated when either hatch is raised, substantially as set forth.

Signed by me this 3d day of February, A. D. 1875.

DANL. MOORE.

Witnesses:
    GEO. T. PINCKNEY,
    GEO. D. WALKER.